Sept. 27, 1932.                J. P. FRENCH                 1,879,164
                           MICA SPLITTING MACHINE
                        Filed Jan. 25, 1930    2 Sheets-Sheet 1
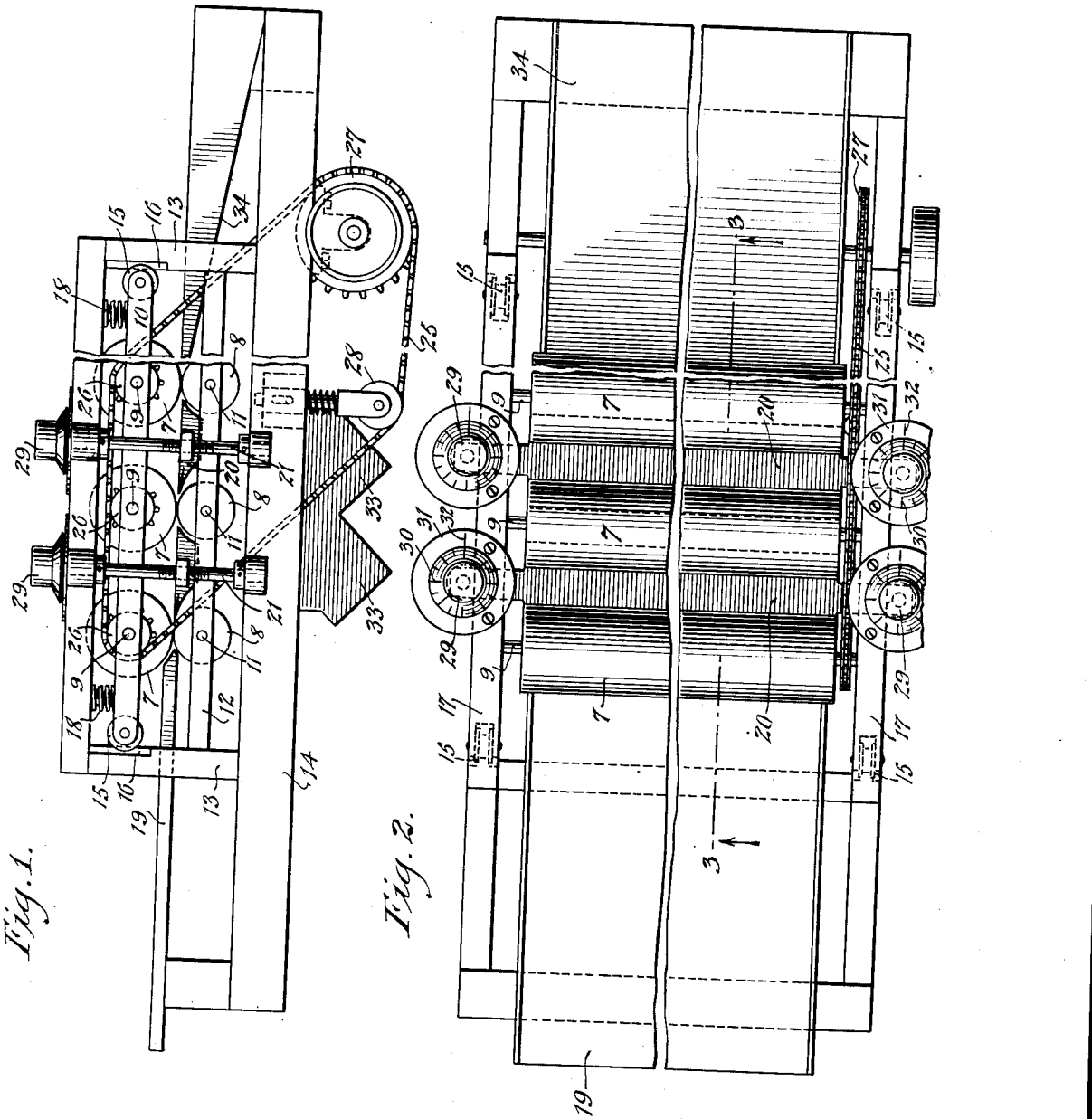
WITNESSES                                        INVENTOR
                                              Joseph P. French
                                                    BY
                                                ATTORNEY Sept. 27, 1932.  J. P. FRENCH  1,879,164
MICA SPLITTING MACHINE
Filed Jan. 25, 1930  2 Sheets-Sheet 2
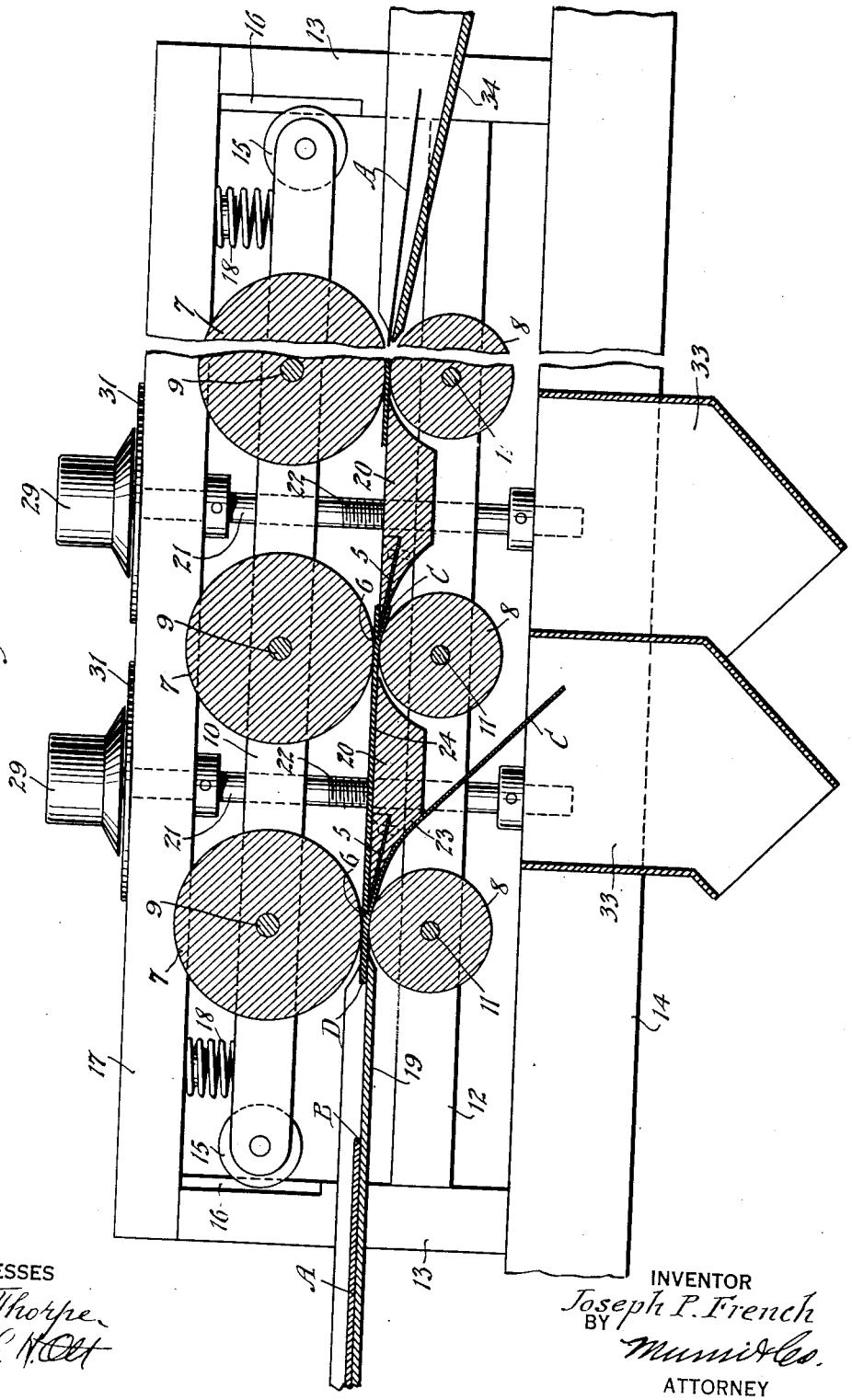

Patented Sept. 27, 1932

1,879,164

UNITED STATES PATENT OFFICE

JOSEPH P. FRENCH, OF BROOKLYN, NEW YORK

MICA SPLITTING MACHINE

Application filed January 25, 1930. Serial No. 423,422.

This invention relates to a machine for accomplishing the separation of the layers or laminations of a laminated material, and the same is especially designed for splitting mica books.

At the present time, the splitting or separation of the layers or laminations of mica books is, in so far as known, entirely accomplished by hand labor, which requires trained operatives, thus rendering the operation particularly expensive for the splitting of mica books of the smaller areas. Further, in stripping or splitting the layers by hand, considerable difficulty is experienced in taking off the required number to procure the exact thickness desired.

The present invention, therefore, broadly comprehends a machine through which mica books may be fed which will accomplish the splitting or stripping off of one or more layers or laminations successively by virtue of mechanism which includes feeding, supporting and separating means.

The invention, furthermore, contemplates in a machine of the character set forth, layer stripping or separating means which is adjustable with respect to fixed supporting and feeding means, whereby said stripping or separating means may be set to strip from the books sheets varying in thickness and in the number of layers.

As a further object, the invention resides in the provision of a pressure actuated feeding means which is constructed in such a manner as to compensate for the decrease in the thickness of the books as they pass through the machine and are successively stripped.

Other objects of the invention reside in the comparative simplicity of construction and mode of operation of the machine, the economy with which the same may be produced and operated and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of a machine constructed in accordance with the invention.

Figure 2 is a top plan view thereof.

Figure 3 is an enlarged fragmentary longitudinal sectional view therethrough taken approximately on the line indicated at 3—3 in Figure 2.

Referring to the drawings by characters of reference, the machine essentially includes a plurality of longitudinally spaced transversely arranged splitting knives 5 and suitable means for feeding and guiding the mica books A through the machine so as to successively present the leading edges B of said mica books to the sharpened cutting edges 6 of the splitting knives in order to strip sheets C of the desired thickness from the books.

The means for feeding and guiding the mica books through the machine may assume various forms but, as illustrated, a plurality of pairs of upper vertically movable driven feed rollers 7 and lower fixed idler feed rollers 8 are employed, the former being secured to transverse shafts 9 journaled in the transversely spaced longitudinally extending supporting bars 10. The latter idler rollers 8 are secured to transverse shafts 11 which are journaled in fixed longitudinal frame bars 12 which are carried by vertical standards 13 secured to a base 14. The supporting bars 10 are formed with bifurcated opposite ends within which sheaves 15 are journaled, said sheaves being mounted and guided for vertical rolling movement over tracks 16 formed on the standards 13. The framework further includes upper longitudinal rails 17 and, if desired, coiled expansion springs 18 may be interposed between the rails 17 and the supporting bars 10 to urge the bars 10 normally downward while tensioning the same against upward movement. A feed table 19 is supported by the framework at what will be termed the front or forward end of the machine and the upper surface of the feed table 19 is disposed preferably in a horizontal plane and in alignment with the upper portion of the periphery of the idler roller 8 of the first pair of feed rollers. The splitting knives 5 are carried by a support 20 and may be removably associated therewith in any manner to permit of the detachment of the splitting knives for the purpose of grinding or otherwise resharpening the same when necessary. The knife supports 20 are mounted for vertical adjustment in any suitable manner but, as illustrated, a pair of transversely spaced vertical shafts 21 are employed for each knife support, and said shafts are swiveled for turning movement in the framework of the machine. The shafts 21 are provided with threaded portions 22 which threadedly engage the knife supports to effect vertical adjustment of the knives and their supports, whereby the cutting edges 6 of the knives may be disposed at relatively different distances above the upper portion of the periphery of the idler rollers 8 for the obvious purpose of varying the thickness of the strips C which are split and separated from the mica books. The forward edge 23 of each knife support 20 is flared downwardly to divergently deflect and separate the strips C from the book. The upper surface 24 of each knife 20 constitutes a feed table for the remaining portion of the mica book which leaves its cutting knife and cooperates with the next succeeding set of feed rollers to properly present the leading edges of the mica book to the succeeding splitting knife. Obviously, due to the yieldable mounting of the upper driven rollers, said rollers will accommodate themselves to the progressively decreasing thickness of each mica book as it moves through the machine. The final or rearmost set of feed rollers 7 and 8 serves merely to take off the remaining thickness of the mica book after the maximum number of desired thicknesses have been split and removed by the splitting knives.

The driven feed rollers 7 may be actuated by any suitable mechanism, but for the purpose of illustration, a sprocket chain 25 is trained around sprocket wheels 26 which are secured to the shafts 9, and said sprocket chain is also trained around a drive sprocket 27. In order to compensate for wear and at the same time for the vertical movement of the rollers 7, a suitably tensioned take-up roller 28 engages with the sprocket chain.

In order to provide means for turning the shafts 21 and for gauging the adjustment of the splitting knives, the shafts 21 are provided at their upper end with manipulating knobs 29 having graduated dials 30 adapted to cooperate with a stationary dial 31 having a graduation 32.

In view of the fact that it may at times be desirable to split sheets C of varying thicknesses by each of the knives respectively, suitable chutes 33 may be positioned relative to each knife to receive and convey off into separate piles the sheets C as they are stripped from the mica book. In order to receive and convey off the remainder of the mica book A which leaves the machine, a chute or drive 34 is provided which extends from a point closely adjacent the rearmost pair of rollers 7 and 8 beyond the rear end of the machine.

In operation, the mica books will be initially laid on the feed table 19 by an operative and the book advanced toward the first set of rollers 7 and 8 until its leading edge is gripped between the rollers and advanced and presented to the forward cutting edge of the first splitting knife 5, which knife will have been previously adjusted to remove a sheet C of the desired thickness having the desired number of laminations. Obviously, the sheet C which is being stripped by the first knife will be removed from the lower portion of the book and, in practice, the next succeeding pair of rollers 7 and 8 will be arranged in close enough proximity to the preceding set to grasp and feed the book before its rear or following edge D leaves the preceding set of feed rollers. This will be accomplished by building the pairs of rollers in closer relation than the minimum size of books which are being operated upon. As the book is leaving the first set of rollers and is being grasped by the second set of rollers, the upper roller 7 of the second pair will automatically space itself from the idler roller 8 in accordance with the thickness of the book presented thereto, this being compensated for by the manner in which the upper driven feed rollers are mounted.

From the foregoing, it will thus be seen that a machine has been devised by virtue of which mica books may be economically split into sheets of the desired thickness so that the splitting operation is expeditiously and accurately accomplished without the necessity of employing skilled or trained operatives for the purpose.

What is claimed is:

1. In a machine for splitting mica books, a plurality of longitudinally spaced pairs of upper driven and lower idler feed rollers between and by virtue of which the mica books are frictionally fed through the machine, a feed table having its upper surface disposed in alignment with the upper portion of the periphery of the lower idler of the first pair of rollers and a splitting knife and support therefor disposed in rear of each pair of rollers, said knife supports each having at the leading edge thereof a downwardly directed under surface for deflecting the separated strip away from the next succeeding lower feed roller.

2. In a machine for splitting mica books. a plurality of longitudinally spaced pairs of upper driven and lower idler feed rollers between and by virtue of which the mica books are frictionally fed through the machine, a feed table having its upper surface disposed in alignment with the upper portion of the periphery of the lower idler of the first pair of rollers, a splitting knife and support therefor disposed in rear of each pair of rollers and mounted for vertical adjustments with respect to the upper portion of the periphery of the lower idler rollers to vary the thickness of the strips which are successively separated from the mica books and a common means for yieldably mounting the driven feed rollers and for urging the same toward the idler rollers.

3. In a machine for splitting mica books, a plurality of longitudinally spaced pairs of upper driven and lower idler feed rollers between and by virtue of which the mica books are frictionally fed through the machine, a feed table having its upper surface disposed in alignment with the upper portion of the periphery of the lower idler of the first pair of rollers, a splitting knife and support therefor disposed in rear of each pair of rollers and mounted for vertical adjustments with respect to the upper portion of the periphery of the lower idler rollers to vary the thickness of the strips which are successively separated from the mica books, a common means for yieldably mounting the driven feed rollers and for urging the same toward the idler rollers and a common means for driving said driven feed rollers.

4. In a machine for splitting mica books, a plurality of longitudinally spaced pairs of upper driven and lower idler feed rollers between and by virtue of which the mica books are frictionally fed through the machine, a feed table having its upper surface disposed in alignment with the upper portion of the periphery of the lower idler of the first pair of rollers and a splitting knife and support therefor disposed in rear of each pair of rollers and mounted for vertical adjustments with respect to the upper portion of the periphery of the lower idler rollers to vary the thickness of the strips which are successively separated from the mica books, the upper surface of the knife supports serving as a feed table for presenting the books to the succeeding pair of rollers.

5. In a machine for splitting mica books, a plurality of longitudinally spaced pairs of vertically movable upper driven and fixed lower idler feed rollers, between and by virtue of which the mica books are frictionally fed through the machine, a feed table having its upper surface disposed in alignment with the upper portion of the periphery of the idler of the first pair of rollers, a splitting knife disposed in rear of each pair of rollers and a support for each knife located between each adjacent pair of lower rollers and extending in close proximity to the peripheries of said rollers and having its upper surface disposed in a plane substantially at a tangent to the peripheries of said rollers to provide a support for the mica books as they are fed from a preceding pair of rollers to a succeeding pair of rollers.

6. A machine for successively splitting sheets of desired thicknesses from a mica book fed through the machine, said machine including a plurality of longitudinally spaced transversely arranged pairs of superposed feeding rollers normally urged into peripheral engagement and adapted to clampingly engage the mica book, a knife arranged in rear of each pair of rollers with its cutting edge disposed in close relation to the rollers at the point of peripheral contact, a support for each knife having an upper flat surface extending rearwardly from the cutting edge of the knife to a point closely adjacent the contact point of a succeeding pair of feeding rollers and vertically disposed swiveled shafts having screw engagement with the knife supports for effecting independent vertical adjustment of each knife and knife support to vary the thickness of the strips to be cut.

Signed at Brooklyn in the county of Kings and State of New York this 23 day of January A. D. 1930.

JOSEPH P. FRENCH.